United States Patent
Fowler et al.

(10) Patent No.: US 6,173,376 B1
(45) Date of Patent: *Jan. 9, 2001

(54) DATA BACKUP AND RESTORE METHOD AND SYSTEM IN A MULTISYSTEM ENVIRONMENT

(75) Inventors: Craig Boyd Fowler, Endwell; Warren W. Grunbok, Jr., Apalachin; Gilford Francis Martino, Endwell; Paul Raymond Vasek, Apalachin, all of NY (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/725,793

(22) Filed: Oct. 3, 1996

(51) Int. Cl.[7] .............................. G06F 12/00; G06F 12/16
(52) U.S. Cl. ............................................ 711/162; 711/165
(58) Field of Search ................ 395/182.03, 182.04, 395/712; 711/100, 162, 112, 4, 5, 165

(56) References Cited

U.S. PATENT DOCUMENTS

| | | | |
|---|---|---|---|
| 5,008,936 | 4/1991 | Hamilton et al. | 380/50 |
| 5,157,783 | 10/1992 | Anderson et al. | 395/600 |
| 5,325,519 | 6/1994 | Long et al. | 395/575 |
| 5,327,551 | 7/1994 | Kaneko | 395/575 |
| 5,327,566 | 7/1994 | Forsyth | 395/775 |
| 5,386,544 | 1/1995 | Nakamura | 395/575 |
| 5,386,552 | 1/1995 | Garney | 395/575 |
| 5,414,864 | 5/1995 | Koizumi | 395/775 |
| 5,428,785 | 6/1995 | Morel et al. | 395/700 |
| 5,634,052 * | 5/1997 | Morris | 395/601 |
| 5,742,792 * | 4/1998 | Yanai et al. | 395/489 |
| 5,742,829 * | 4/1998 | Davis et al. | 395/712 |
| 5,764,982 * | 6/1998 | Madduri | 395/680 |
| 5,768,623 * | 6/1998 | Judd et al. | 395/857 |

OTHER PUBLICATIONS

Crowley, et al. "Optimized Save Procedure Using Physical Disk Addresses", IBM Technical Disclosure Bulletin, vol. 26, No. 5, pp. 2476–2478, Oct. 1983.
International Technical Support Organization, "Upgrading to AS/400 Advanced Series PowerPC AS", pp. iii–, viii, ix, 1–9, 188–200, Jan. 1996.

* cited by examiner

Primary Examiner—John W. Cabeca
Assistant Examiner—M. Anderson
(74) Attorney, Agent, or Firm—Heslin & Rothenberg, P.C.

(57) ABSTRACT

A data backup and restore method and system for a multiple computer system environment is provided. The method/system comprises an automated approach for backing up and if necessary restoring computer system data from a first computer system to an auxiliary storage pool of a second computer system. At the first computer system, a renaming of system data to be backed up is accomplished such that the renamed system data designates the first computer system as the source system of the system data and comprises a name different from any name of system data at the second computer system. The renamed system data is then backup stored by the first computer system to the auxiliary storage pool of the second computer system. Multiple computer systems in the multisystem environment can be backed up to the same target computer system, either to the same auxiliary storage pool or to different auxiliary storage pools. Partial or complete restore of the backed up system data is also discussed.

41 Claims, 8 Drawing Sheets

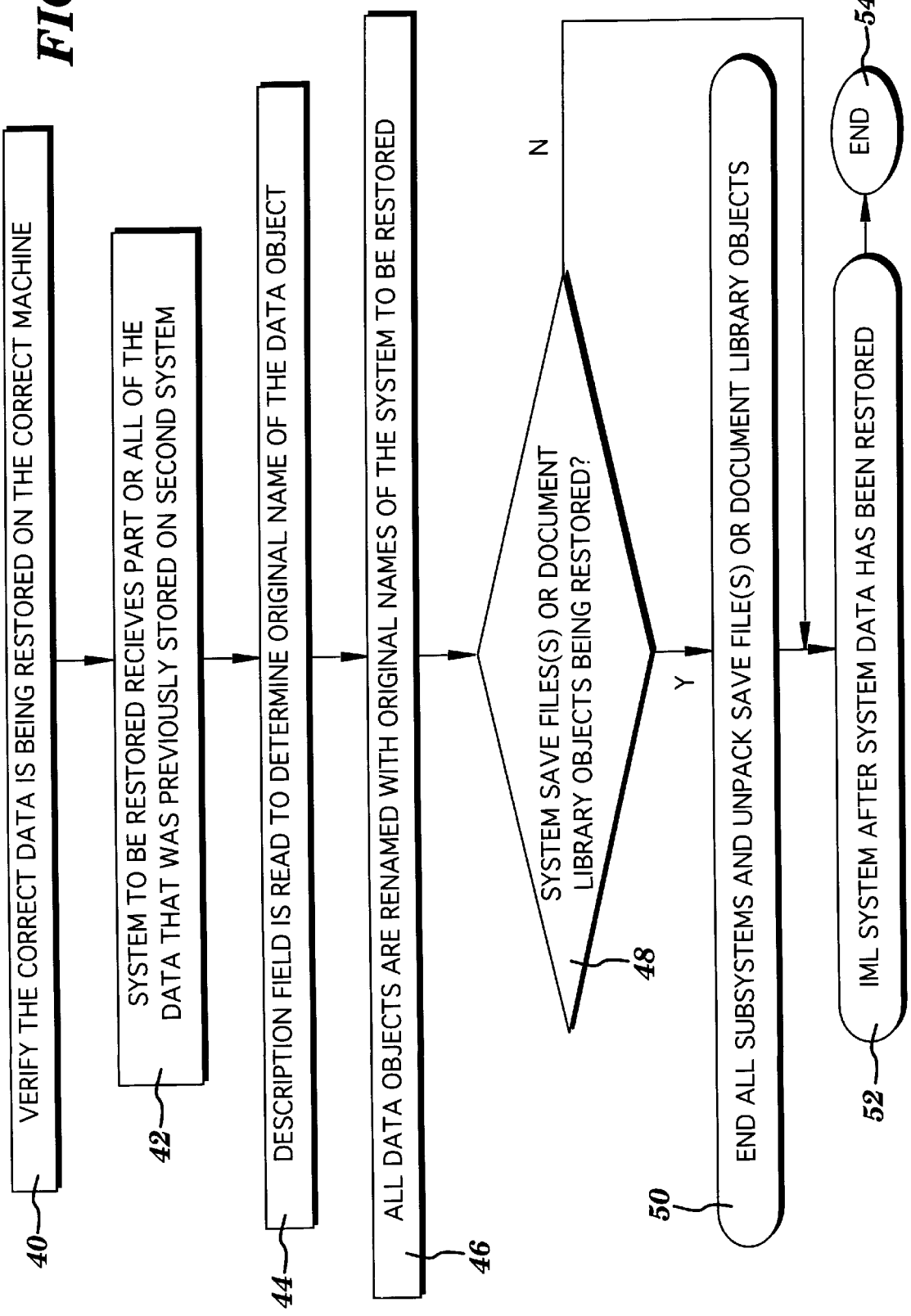

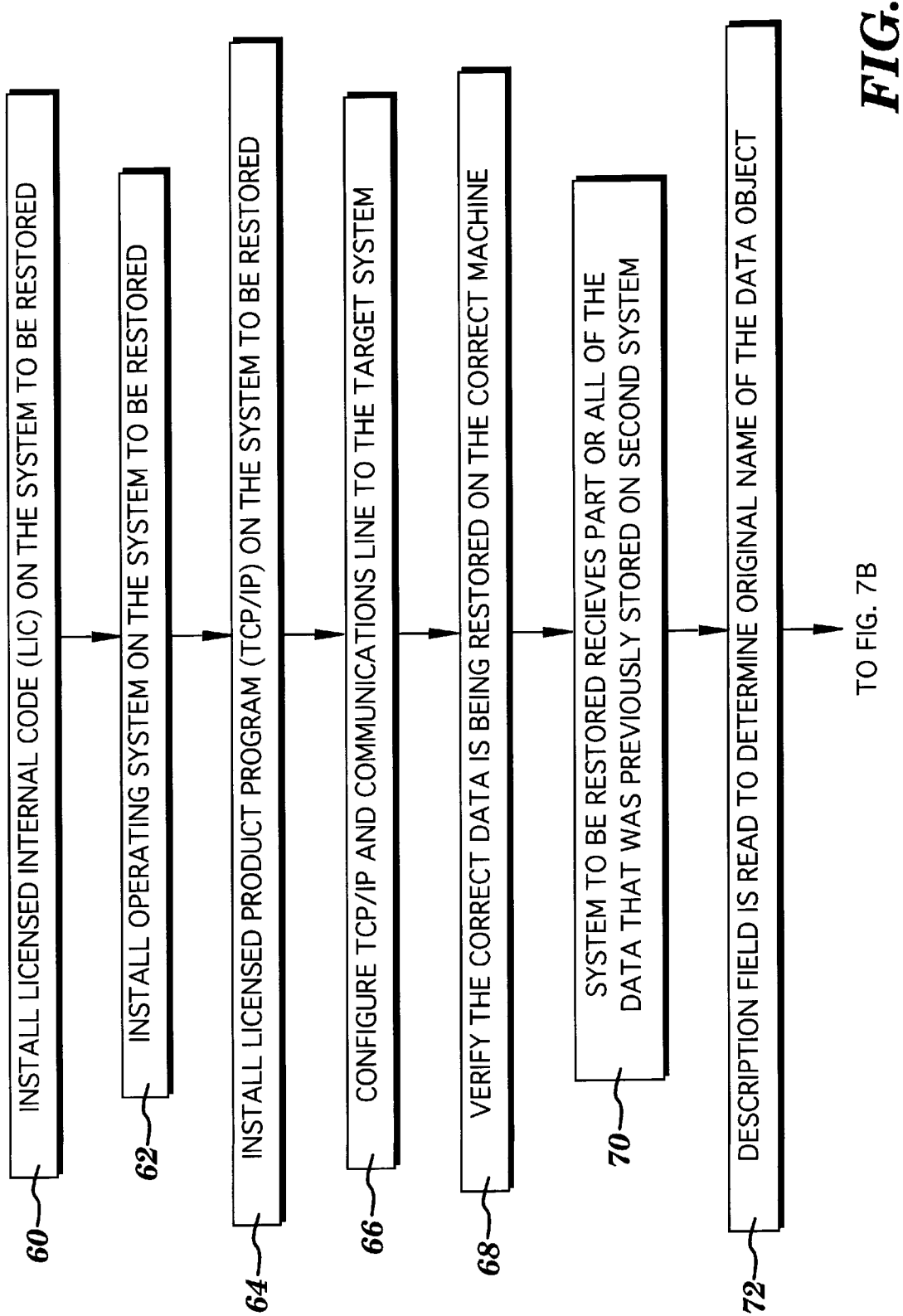

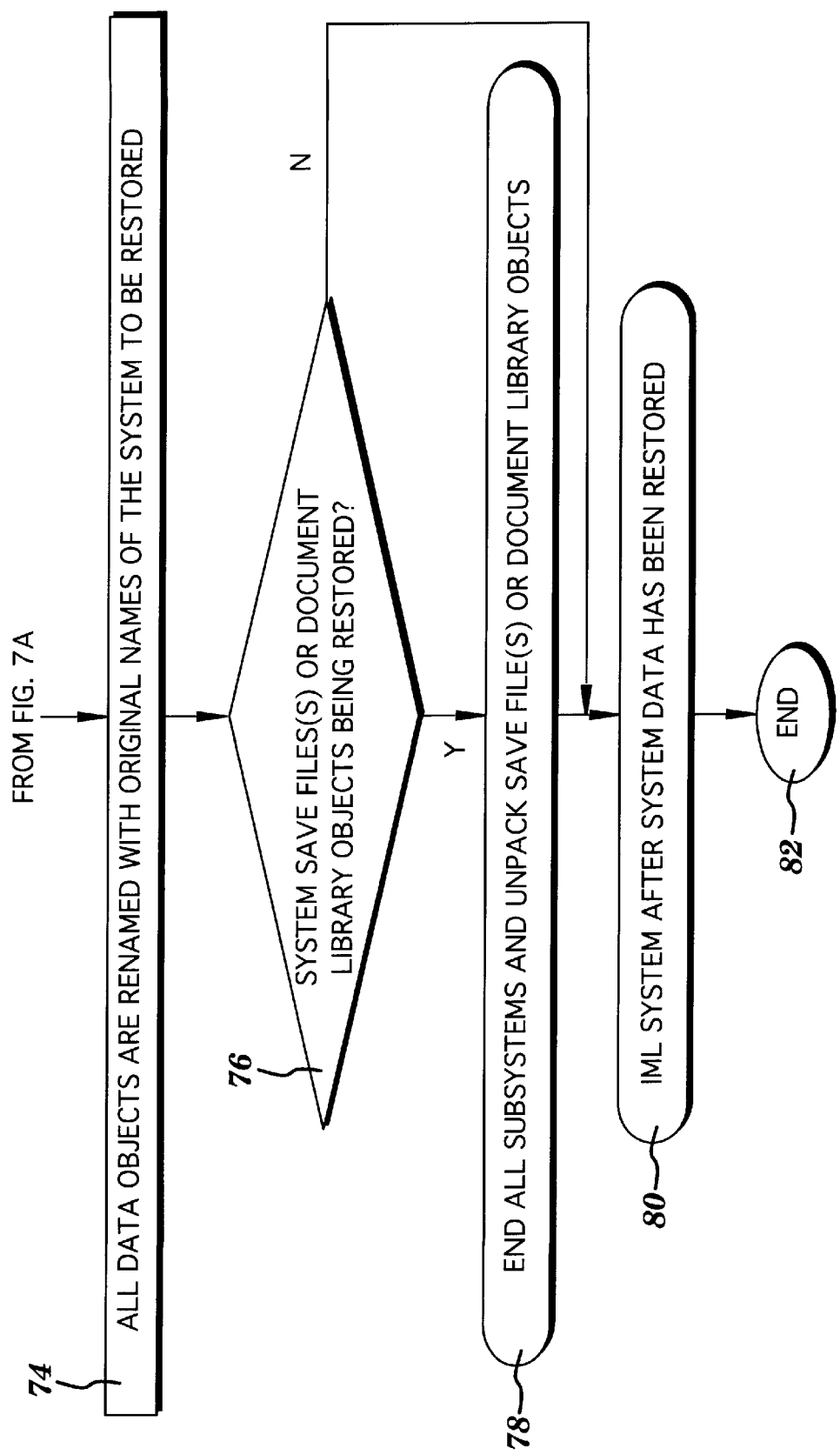

DATA BACKUP AND RESTORE METHOD AND SYSTEM IN A MULTISYSTEM ENVIRONMENT

TECHNICAL FIELD

This invention relates in general to backup and restore of computer system data, and more particularly, to an automated method and system for backup storing and then restoring computer system data by employing auxiliary storage pools associated with at least one computer system in the multisystem environment.

BACKGROUND ART

In order to ensure against loss of data, computer systems are routinely backed up today on magnetic media, which often requires interactive responses and the physical presence of an individual. Since backup of large computer systems can require many hours to complete, backup of system data often occurs on other than a daily basis. For example, some systems implement an incremental dumping policy wherein a complete system data dump occurs periodically, i.e., weekly or monthly, with a daily dump only of those files which have been modified since the full dump. This is a partial solution, however, since the process can still be time consuming, interactive, and require the presence of an individual.

A need thus exists in the computer system field for an improved approach to backup store and restore of system data, and preferably for a technique which allows for continued operation of the computer system being backed up.

DISCLOSURE OF INVENTION

Briefly summarized, the invention comprises in one aspect a method for backing up system data in a multiple computer system environment. The method includes: at a first computer system of the multiple computer system environment, renaming system data to be backed up, the renamed system data designating the first computer system as source system of the system data to be backed up and comprising a name different from any name of system data at a second computer system in the multiple computer system environment; and backup storing the renamed system data of the first computer system to memory of the second computer system in the multiple computer system environment.

In another aspect, a system is provided for backup storing system data in a multiple computer system environment. The system includes at a first computer system in the multiple system environment, means for renaming system data to be backed up. This renaming means includes means for designating the first computer system as source system of the system data to be backed up, and for designating the data to be backed up with a name different from any name of system data at a second computer system. Backup storing means is provided for then storing the renamed system data of the first computer system to memory of the second computer system.

In another aspect, a computer program product is provided herein comprising a computer usable medium having computer readable program code means therein for use in backing up system data in a multiple computer system environment. The computer readable program code means in the computer program product includes computer readable program code means for affecting at a first computer system in the multiple computer system environment, renaming of system data to be backed up. The renamed system data designates the first computer system as source system of this data and comprises a name different from any name of system data at a second computer system in the multiple computer system environment. Computer readable program code means is also provided for affecting backup storing of the renamed system data of the first computer system to memory of the second computer system in the multiple computer system environment.

Enhanced features of each of the above-outlined aspects of the present invention are also described and claimed herein. For example, each aspect has an associated technique for restoring all or part of the backed up system data to the source system.

To restate, the present invention allows backup of all pertinent system information from one computer system to another computer system in an environment of multiple computer systems located either locally or remotely from one another and coupled together via one or more communication links, such as a local area network. Backup of system data can include system values, configurations, user libraries and security information, essentially everything that is presently backed up on magnetic media can be backed up to a second system's auxiliary storage pool (ASP), which by way of example can comprise DASD. Backup can occur automatically from one system to another, and without any interactive response. Backup can even occur while the computer system being backed up is active. As a further advantage, the present invention could be used to update or replace data that is being shared between several locations. Also, a restore operation can be readily accomplished by running the backup store operation in reverse.

BRIEF DESCRIPTION OF DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

FIG. 6 is a flowchart of one embodiment of system data restore in accordance with the present invention; and FIGS. 7a & 7b are a flowchart of an alternate embodiment of system data restore in accordance with the present invention.

BEST MODE FOR CARRYING OUT THE INVENTION

Figure 1:
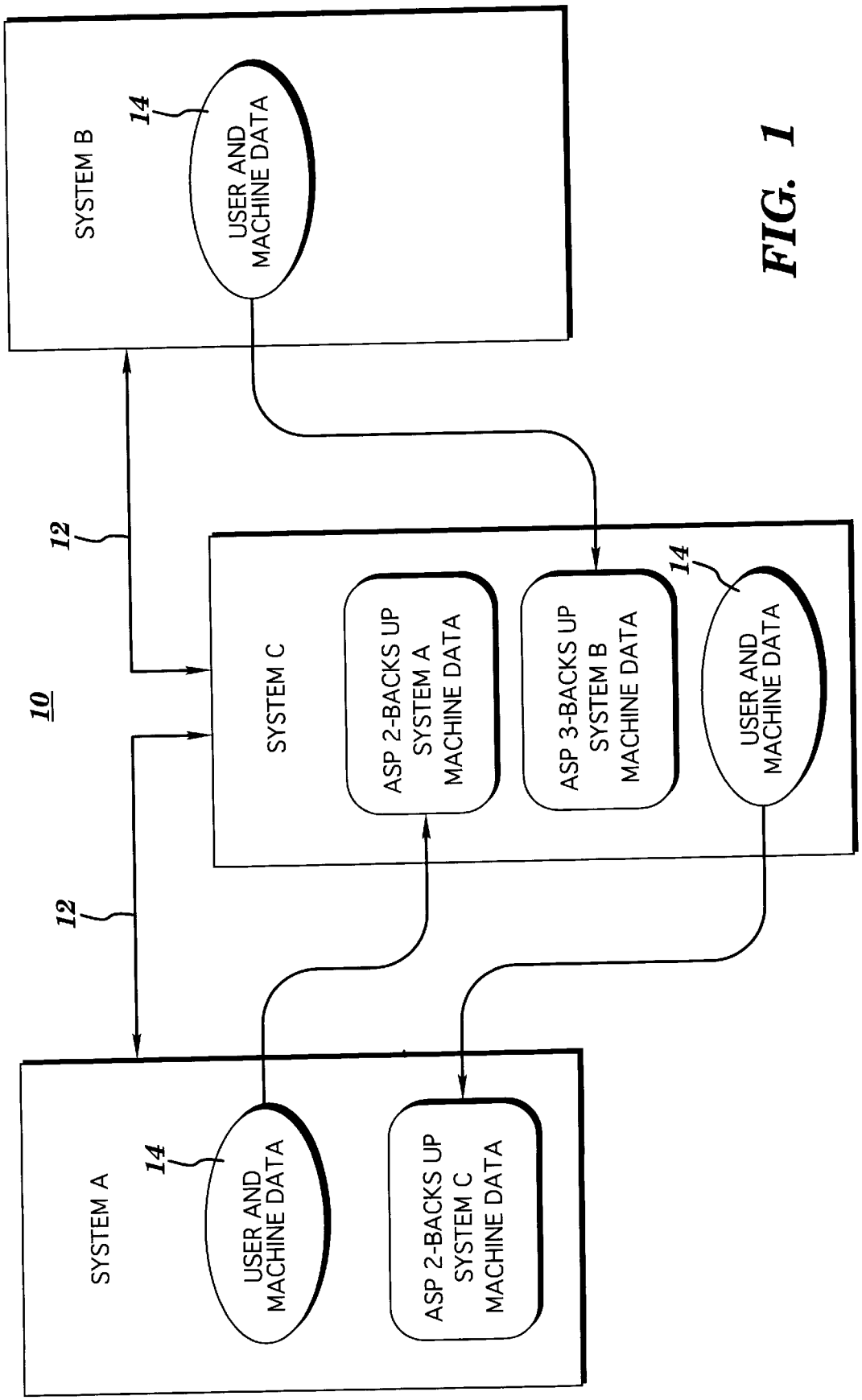
FIG. 1 depicts an overview example of system data backup in a multiple computer system environment in accordance with the present invention.

As noted, the present invention broadly comprises the concept of backing up system data of a first computer system in a multisystem environment on storage associated with a second computer system of the multisystem environment. In particular, the system data of the first computer system can be backed up to an auxiliary storage pool of the second computer system. Since the auxiliary storage pool typically comprises DASD storage, then for most applications the first computer system's system data can be entirely backed up onto a single auxiliary storage pool of the second computer system. A number of additional computer systems could be backed up to the same or different auxiliary storage pools of the second computer system, or another computer system(s) of the multisystem environment. Further, the second computer system's data could be backed up to an auxiliary storage pool in the first computer system.

A detailed embodiment of the present invention is provided herein with reference to International Business Machine's AS/400 Advanced Series Power PC AS Microprocessor, and in particular, to an environment having multiple such microprocessors coupled together to form a single multiprocessing system. For detailed information on the AS/400 Microprocessor, reference can be made to a number of IBM publications, including a January, 1996 IBM International Technical Support Organization Publication SG24-4600-00 entitled "Upgrading to AS/400 Advanced Series Power PC AS," which is incorporated herein by reference in its entirety. The Power PC AS microprocessor is an advanced 64-bit RISC microprocessor designed for the AS/400 Advanced Series.

A significant feature of IBM's AS/400 Advanced Series Power PC AS is a set of control language (CL) commands referred to as Object Connect/400. These commands include save and restore commands which simplify and efficiently move individual objects, entire libraries, or entire integrated file system directories from one AS/400 system to another. When using Object Connect/400, objects are moved synchronously from one system to another while avoiding both intermediate save files and copies to distribution queues.

Pursuant to the present invention, Object Connect/400 is used in an environment with more than one AS/400 system to backup copies of critical objects, libraries, document library objects (DLOs), configuration data, or integrated file system (IFS) directories on another AS/400 system, for example, for use during planned outages or for disaster recovery. Object Connect/400 operates between AS/400 systems that are connected by standard communication facilities. The connections can be local area networks (LANs) or remote communications connections. For a more detailed explanation of Object Connect/400 reference should be made to the above-incorporated International Technical Support Organization Publication entitled "Upgrading to AS/400 Advanced Series Power PC AS," and in particular to Chapter 12 thereof entitled "Object Connect for OS/400."

FIG. 1 depicts a multisystem environment, generally denoted 10, which includes three systems (System A, System B and System C), each of which is assumed to comprise IBM's AS/400 Advanced Series Power PC. Both System A and System B are linked via communication links 12 to System C. As noted, the present invention comprises the concept of backing up user and machine data (herein referred to as "system data") from one system to another system within multisystem 10. For example, user and machine data 14 from System A can be backed up to an auxiliary storage pool, labeled ASP 2, comprising part of or associated with System C. Similarly, the user and machine data 14 of System B is remotely backed up to an auxiliary storage pool, labeled ASP 3, in System C. Finally, data 14 from System C is shown to be backed up to an auxiliary storage pool (ASP 2) on System A.

Again, automated backup storage in accordance with the invention can be accomplished using the Object Connect/ 400 save and concurrent restore tool available on existing AS/400 Systems, and superimposing a feature to save and then restore to a remote system's auxiliary storage pool. One problem encountered is that in an AS/400 System, two objects of the same name cannot co-exist. Other RISC based systems would have the same restriction. The invention avoids this problem by using the Object Connect commands in combination with renaming the system data prior to transfer from a source system to a target system.

Figure 2:
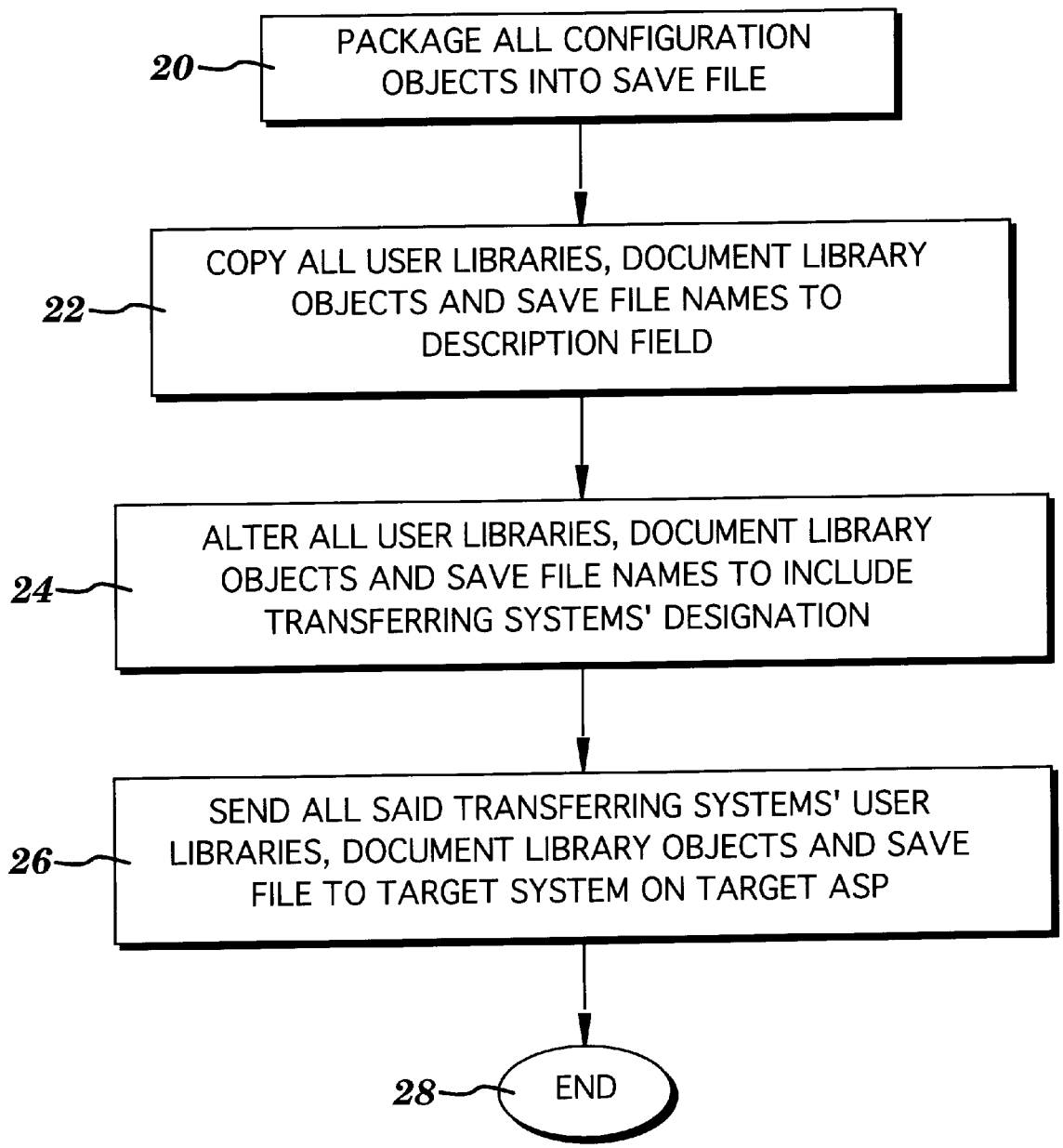
FIG. 2 is a flowchart of one embodiment of system data backup in accordance with the present invention.

FIG. 2 presents one embodiment of a save process in accordance with this invention. Various user and machine data, again referred to herein as system data, can be backed up to a remote system employing the present invention. Initially, however, any configuration objects and security information need to be packaged into a save file(s) 20. Packaging/copying is required when AS/400 is up and running, since otherwise objects would have the same name. Thus, the present invention contemplates the ability to backup from one system to another while the systems are running. A 'lock' bit signals when an object to be backed up is in use, in which case backup processing would skip and then return to the object at a future time.

Continuing with FIG. 2, renaming occurs by first copying names of all user libraries, document library objects and save files to their respective description fields 22, and then altering all user library, document library object and save file names to include a designation representative of the source or transferring system 24.

For non-system files (i.e., those whose names do not start with Q), the source system changes the first three digits of the file name to the last three digits of the unique system name, and the files are transferred to the target system with this new name. The original names of the objects are housed within the object description field. Thus, when files are returned during a restore operation, the source system (now target system) knows to restore the object (file) names from the description fields which house the original names.

For system files i.e., those having a name starting with the letter Q) the object name is not changed, but the object is packaged within a save file. The name is not changed because the name includes a unique system designation which is different for each AS/400 system, and therefore cannot comprise the same name as a file on the target system. Save files can package libraries, and libraries can contain objects. The entire save file is transferred to the target (backup) system, e.g., System C, from the source system (System A). On a restore operation, the target system, System C, returns the save file(s) to the source system, System A. The source system then may end all subsystems and execute an unstore command that unpacks the library and objects that are needed. Unpacking does not require in this case changing names, as necessary for the non-system files. System files differ from all other files, and are therefore handled different. This is because if a system is using those particular system files, it would not allow an application to write over them. Closing subsystems does not close the system files.

Completing FIG. 2, once renamed, the system data including user libraries, document library objects and save files are transferred to the target system on the target auxiliary storage pool 26. This completes 28 save processing in accordance with the present invention.

Figure 3:
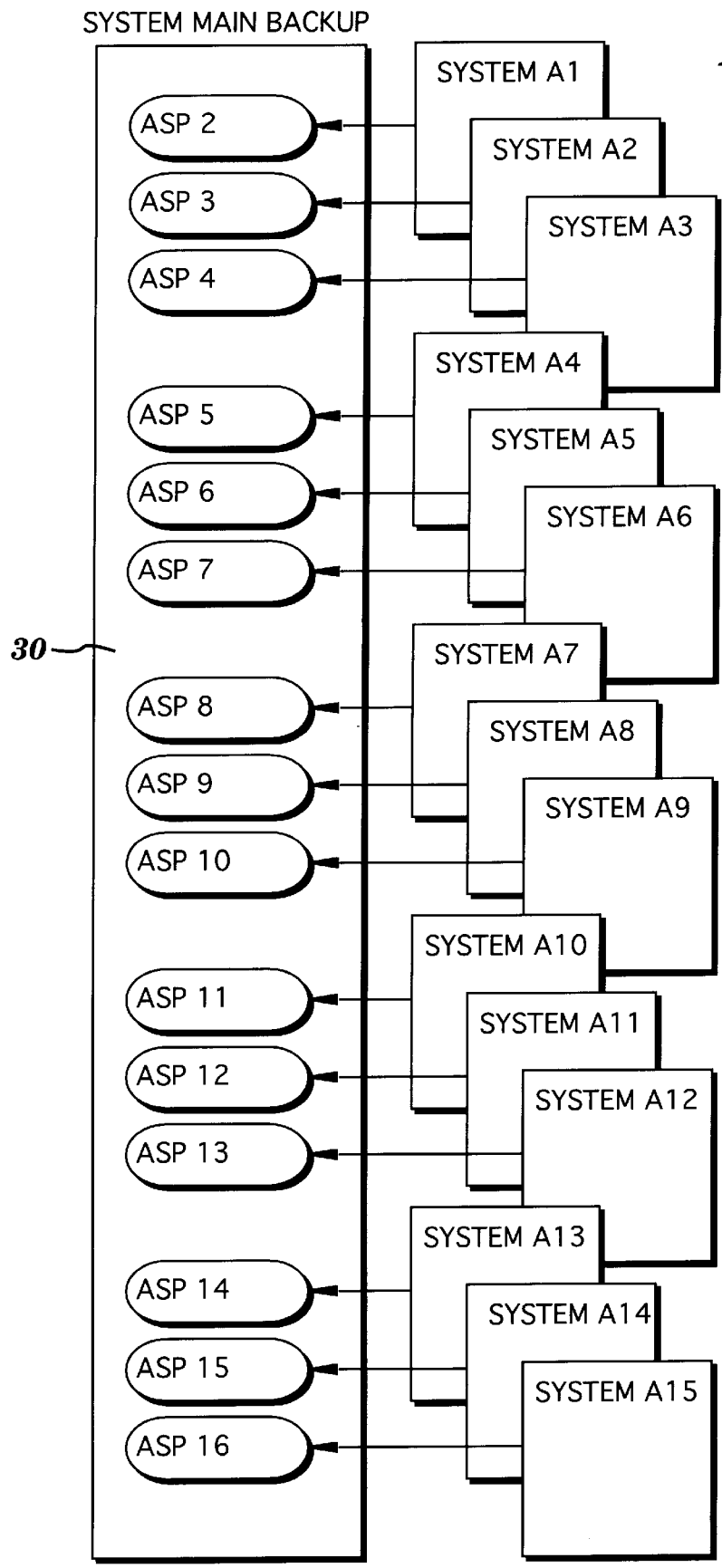
FIG. 3 is a block diagram of one possible system data backup approach in accordance with the present invention, wherein computer systems A1–A15 backing store data into a main backup system having auxiliary storage pools 2–16.

FIG. 3 presents one possible scheme for backing up system data from fifteen different systems in a multisystem environment to a single system main backup 30 containing auxiliary storage pools ASP 2–ASP 16. In implementation, system main backup 30 could comprise a further system, System A0, which would require the first auxiliary storage pool, ASP 1 (not shown), for its own data. Numerous variations on the backup scheme presented in FIG. 3 are possible. For example, Systems A1–A15 could be backed up to two separate main backups for added protection.

Figure 4:
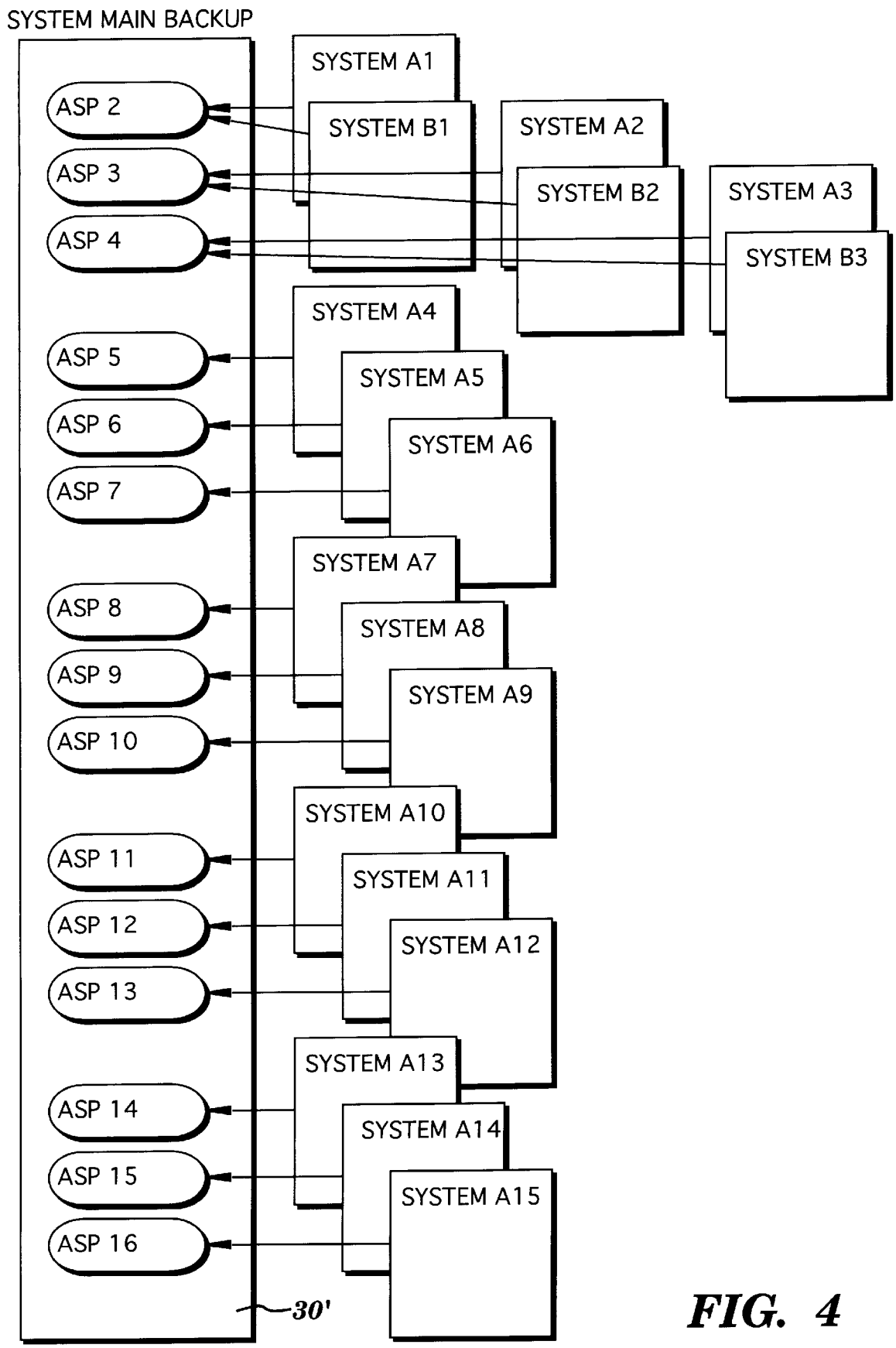
FIG. 4 is a block diagram of an alternate embodiment of a system data backup approach wherein auxiliary storage pools ASP 2–ASP 4 each receive system data from two different systems of the multiple systems.

A further alternative approach is depicted in FIG. 4, wherein ASP 2, ASP 3 and ASP 4 of a system main backup 30' each receive system data from two different systems, namely, System A1,B1, System A2,B2, & System A3,B3, respectively. As noted above, each auxiliary storage pool comprises DASD, which may be of sufficient size to accommodate all system data from more than one system. Those skilled in the art will recognize that numerous additional variations on system storage using the techniques presented herein are possible.

Figure 5:
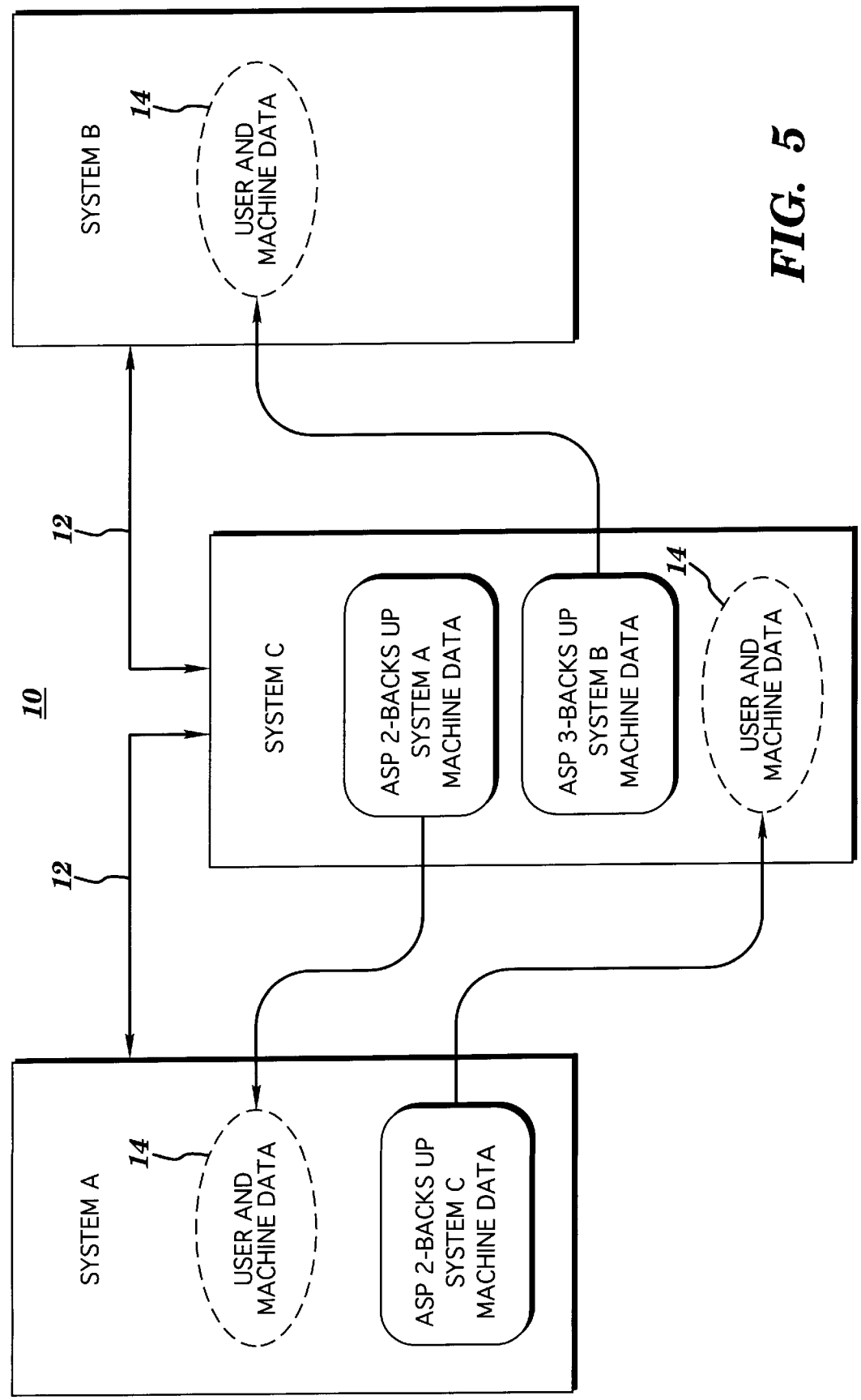
FIG. 5 is an overview of a restore operation in accordance with the present invention wherein system data is transferred from auxiliary storage pool backups to the corresponding source systems.

Restore of system data is depicted in FIG. 5. Multiple computer system environment 10 again includes a System A, System B and System C, wherein System A is connected via communications link 12 to System C and System B is connected via another communications connection 12 to System C. As shown, user and machine data for System A is restored from ASP 2 of System C, user and machine data 14 for System B is restored from ASP 3 of System C, while user and machine data 14 for System C can be restored from ASP 2 of System A.

Restoring of system data to a source system can occur with either the source system operating system functional or non-functional, as in the case of a catastrophic failure. FIG. 6 depicts an embodiment of a restore in accordance with the invention wherein the operating system of the source system is assumed to remain functioning. During the restore operation, all or only a portion of saved system data residing on the predetermined ASP of the second system can be returned to the first system. Upon receipt of this retrieved data, the first system verifies that the correct data is being restored by determining if the system designation of the data matches the first system's designation 40. Thereafter, the first system to be restored receives the retrieved system data which may include save files, user libraries, and/or document library objects (DLOs) 42.

Next, each file's description field is read by the first system to determine the original name of the file 44. The user libraries, document library objects and save files are renamed with the original name 46. Processing then determines whether system save files or document library objects are being restored 48. If yes, any subsystem processing at the first system is terminated and the save file(s) and/or document library object(s) are unpacked 50. If other data is being restored, then subsystem processing need not be terminated and processing proceeds directly to initialize, or internal microcode load (IML), the system after all data has been restored 52, which completes the restore operation 54.

An alternate process flow is necessary for those situations where the source system, i.e., system to be restored, has a non-functioning operating system. Processing in this case is depicted in FIGS. 7a & 7b. Specifically, the licensed internal code must first be installed at the hardware level 60, which is followed by installation of the operating system 62. Thereafter, the installed product program (TCP/IP) is up loaded on the system to be restored 64, and the communications line is configured between the source system and the target system, which contains the system data to be restored 66.

Thereafter, processing proceeds as described above in connection FIG. 6. Specifically, verification is made to ensure that the correct data is being restored 68, after which the source system receives the retrieved data which comprises either part or all of the system data previously backed up on the second system 70. The description field is read to determine the original name of each file 72 and any user libraries, document library objects and save files are renamed with their original names 74.

Unpacking then depends upon whether the restored data comprises a system file or document library object 76. If yes, then all subsystems are ended and the save file or document library objects are unpacked 78. Otherwise, processing proceeds directly to initialize or IML the source system after all system data has been retrieved 80, thus completing the restore operation 82.

Note that multiple save and restore operations in accordance with this invention can be accomplished simultaneously in the multisystem environment using the Object Connect/400 software discussed above. Restore of specified libraries from a particular ASP can be accomplished by running the Object Connect/400 tool in reverse and specify the libraries with the new names, indicative of the system(s) that the libraries came from. Again, the original file name is stored in the "user attribute" field of the file.

The present invention can be included in one or more computer program products comprising computer usable media, in which the media include computer readable program code means for providing and facilitating the mechanisms of the present invention. Products can be included as part of a computer system or sold separately. One of ordinary skill in the art can readily implement the concepts presented based upon the disclosure set forth above.

To restate, the present invention allows backup of all pertinent system information from one computer system to another computer system in an environment of multiple computer systems located either locally or remotely from one another and coupled together via one or more communication links, such as a local area network. Backup of system data can include system values, configurations, user libraries and security information, essentially everything that is presently backed up on magnetic media can be backed up to a second system's auxiliary storage pool (ASP), which by way of example can comprise DASD. Backup can occur automatically from one system to another, and without any interactive response. Backup can even occur while the computer system being backed up is active. As a further advantage, the present invention could be used to update or replace data that is being shared between several locations. Also a restore operation can be readily accomplished by running the backup store operation in reverse.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A backup method for saving system data in a multiple computer system environment, said backup method comprising:

(a) at a non-dedicated, first computer system in the multiple computer system environment, renaming system data to be backed up with an alternate name, said alternate name of said renamed system data designating said first computer system as source system of said system data to be backed up and comprising a name different from any name of system data at a non-dedicated, second computer system in the multiple computer system environment, said system data comprising user data and machine data;

(b) backup storing, by said first computer system, said renamed system data of said first computer system to memory of the second computer system in the multiple computer system environment using said alternate name; and wherein said renaming (a) and said backup storing (b) are accomplished while said first computer system is active.

2. The backup method of claim 1, wherein said renaming (a) and said backup storing (b) are each accomplished automatically.

3. The backup method of claim 1, wherein said backup storing (b) comprises storing said renamed system data of said first computer system to a target auxiliary storage pool (ASP) of the second computer system, said second computer system having multiple ASPs, said target ASP comprising one ASP of said multiple ASPs.

4. The backup method of claim 3, wherein said system data comprises at least one of a system file, user library, document library object and saved file, wherein when said system data comprises a system file, said method further comprises packaging said system file in a save file.

5. The backup method of claim 3, wherein said renaming (a) comprises placing an original name of said system data to be backed up in a description field associated with said system data to be backed up using said alternate name.

6. The backup method of claim 3, further comprising:

at a non-dedicated third computer system in the multiple computer system environment, renaming system data to be backed up with a third alternate name, said third alternate name of said renamed system data designating said third computer system as source system of said system data to be backed up and comprising a name different from any name of system data at said second computer system in the multiple computer system environment; and backup storing said renamed system data of said third computer system to one ASP of said second computer system, said one ASP receiving said renamed system data of said third computer system being different from said one ASP of said second computer system receiving said renamed system data of said first computer system.

7. The backup method of claim 6, further comprising:

at said second computer system in the multiple computer system environment, renaming system data to be backed up with a second alternate name, said second alternate name of said renamed system data designating said second computer system as source system of said system data to be backed up and comprising a name different from any name of system data at said first computer system in the multiple computer system environment; and backup storing said renamed system data of said second computer system to memory of said first computer system in said multiple computer system environment using said second alternate name.

8. The backup method of claim 1, further in combination with a method for restoring at least part of said system data to said first computer system, said restoring method comprising:

(c) retrieving system data comprising at least part of said renamed system data from said memory of said second computer system;

(d) determining whether said retrieved system data originated with said first computer system; and (e) accepting at said first computer system said retrieved system data when said first computer system comprises the source system for said retrieved system data.

9. The combination backup and restore method of claim 8, wherein said accepting (e) comprises reading a description field associated with said retrieved system data to determine an original name assigned to said retrieved system data, and renaming said retrieved system data with said original name and restoring said retrieved system data on said first computer system using said original name.

10. The combination backup and restore method of claim 9, wherein said system data includes either a document library object or system saved file and wherein said restore method includes suspending any active subsystems on said first computer system upon accepting said retrieved system data.

11. The combination backup and restore method of claim 10, wherein said restore process further comprises initializing said first computer system with said retrieved system data restored to the first computer system.

12. The backup method of claim 1, wherein said first computer system and second computer system are remotely located from each other and coupled to each other via a communications link, and wherein said backup storing (b) includes communicating said renamed system data from said first computer system to said second computer system over said communications link.

13. The backup method of claim 1, wherein said multiple computer system environment comprises additional computer systems other than said first computer system and said second computer system, and wherein said method further comprises backing up each of said additional computer systems by renaming system data at each additional computer system to be backed up with an alternate name, said alternate name of said renamed system data designating the corresponding additional computer system as source system of said system data to be backed up and comprising a name different from any name of system data at the second computer system, and backup storing said renamed system data of the additional computer system to memory of the second computer system in the multiple computer system environment.

14. The backup method of claim 13, wherein said backup storing (b) comprises for each additional computer system, storing its renamed system data to a different auxiliary storage pool of the second computer system.

15. The backup method of claim 1, further comprising:

at said second computer system in the multiple computer system environment, renaming system data to be backed up with a second alternate name, said second alternate name of said renamed system data designating said second computer system as source system of said system data to be backed up and comprising a name different from any name of system data at said first computer system in the multiple computer system environment; and backup storing said renamed system data of said second computer system to memory of the first computer system in the multiple computer system environment using said second alternate name.

16. The backup method of claim 15, wherein said first computer system and said second computer system each comprise RISC microprocessors.

17. The backup method of claim 15, wherein said second computer system performs said backup storing of said renamed system data of said second computer system to memory of the first computer system.

18. The backup method of claim 15, wherein said second computer system initiates said backup storing of said renamed system data of said second computer system to memory of the first computer system.

19. The backup method of claim 1, wherein said renaming (a) and said backup storing (b) are accomplished while both said first computer system and said second computer system are active, and wherein said backup method further comprises:
   employing a "lock" bit signal at said first computer system when an object to be backed up is in use, said backup method comprising skipping said object for backup when said "lock" bit signals that said object is in use by said first computer system, and subsequently returning to said object for backup after said "lock" bit no longer signals said object is in use.

20. A system for backup storing system data in a multiple computer system environment, said system comprising:
   at a non-dedicated, first computer system in the multiple computer system environment, means for renaming system data to be backed up with an alternate name, said means for renaming system data including means for designating with said alternate name said first computer system as source system of said system data to be backed up and for designating said data to be backed up with a name different from any name of system data at a non-dedicated, second computer system, said system data comprising user data and machine data;
   means for backup storing, by said first computer system, said renamed system data of said first computer system to memory of the second computer system in the multiple computer system environment using said alternate name; and
   wherein said means for renaming and said means for backup storing function while said first computer system is active.

21. The system of claim 20, wherein said means for backup storing comprises means for storing said renamed system data of said first computer system to an auxiliary storage pool of said second computer system.

22. The system of claim 21, wherein said multiple computer system environment includes multiple additional computer systems, each additional computer system having system data to be backed up, and wherein said means for backup storing comprises means for storing the renamed system data of the multiple additional computer systems to multiple auxiliary storage pools of the second computer system, wherein said second computer system comprises a main system backup.

23. The system of claim 22, wherein said means for backup storing comprises means for storing renamed system data of each additional computer system to a different auxiliary storage pool of said second computer system.

24. The system of claim 20, wherein said system data comprises at least one of a system file, user library, document library object and saved file, wherein when said system data comprises a system file, said system further comprises means for packaging said system file in a save file.

25. The system of claim 20, wherein said means for renaming comprises means for placing an original name of said system data to be backed up in a description field associated with said system data renamed with said alternate name.

26. The system of claim 20, further in combination with a system for restoring at least part of the system data of the first computer system, said restoring system comprising:
   means for retrieving system data comprising at least part of said renamed system data from said memory of said second computer system;
   means for determining whether the retrieved system data originated with the first computer system; and
   means for accepting at the first computer system the retrieved system data when the first computer system comprises the source system for the retrieved system data.

27. The combination system of claim 26, wherein said means for accepting comprises means for reading a description field associated with the retrieved system data to determine an original name assigned to said retrieved system data, and means for renaming said retrieved system data with said original name and means for restoring said retrieved system data on said first computer system using said original name.

28. The combination system of claim 27, wherein said system data includes at least one document library object or system saved file, and wherein said system for restoring includes means for suspending any active subsystems on said first computer system upon accepting said retrieved system data.

29. The system of claim 20, further comprising:
   at said second computer system in the multiple computer system environment, means for renaming system data to be backed up with a second alternate name, said second alternate name of said renamed system data designating said second computer system as source system of said system data to be backed up and comprising a name different from any name of system data at said first computer system in the multiple computer system environment; and
   means for backup storing said renamed system data of said second computer system to memory of said first computer system in the multiple computer system environment using said second alternate name.

30. The system of claim 29, wherein said first computer system and said second computer system each comprise RISC microprocessors.

31. The system of claim 29, wherein said means for backup storing said renamed system data of said second computer system to memory of the first computer system comprises means for backup storing, at said second computer system, said renamed system data of said second computer system to memory of the first computer system.

32. The system of claim 29, further comprising means for initiating, at said second computer system, said means for backup storing said renamed system data of said second computer system to memory of the first computer system.

33. A computer program product comprising a computer usable medium having computer readable program code means therein for use in backing up system data in a multiple computer system environment, said computer readable program code means in said computer program product comprising:
   computer readable program code means for causing a computer to effect at a non-dedicated, first computer system in the multiple computer system environment, renaming of system data to be backed up with an alternate name, said alternate name of said renamed system data designating said first computer system as source system of said system data to be backed up and comprising a name different from any name of system data at a non-dedicated, second computer system in the multiple computer system environment, said system data comprising user data and machine data;

computer readable program code means for effecting backup storing, by said first computer system, of said renamed system data of the first computer system to memory of the second computer system in the multiple computer system environment using said alternate name; and wherein said computer readable program code means for renaming system data to be backed up and said computer readable program code means for backup storing said renamed system data by said first computer system function while said first computer system is active.

34. The computer readable program code means of claim 33, wherein said computer readable program code means for backup storing said renamed system data of said first computer system comprises computer readable program code means for backup storing said renamed system data of said first computer system to an auxiliary storage pool of said second computer system.

35. The computer readable program code means of claim 34, wherein said system data comprises at least one of a system file, user library, document library object and saved file, wherein when said system data comprises a system file, said computer readable program code means in said computer program product further comprises computer readable program code means for packaging said system file in a save file.

36. The computer readable program code means of claim 33, wherein said computer readable program code means for renaming said system data to be backed up comprises computer readable program code means for placing an original name of said system data to be backed up in a description field associated with said system data.

37. The computer readable program code means of claim 33, wherein said computer readable program code means in said computer program product includes computer readable program code means for use in restoring at least part of the system data to the first computer system, said computer readable program code means in said computer program product further comprising:

computer readable program code means for retrieving system data comprising at least part of said renamed system data from said memory of said second computer system;

computer readable program code means for determining whether said retrieved system data originated with said first computer system; and computer readable program code means for accepting at the first computer system said retrieved system data when the first computer system comprises the source system for the retrieved system data.

38. The computer readable program code means of claim 37, wherein said computer readable program code means for accepting at the first computer system said retrieved system data comprises computer readable program code means for reading a description field associated with the retrieved system data to determine an original name assigned to said retrieved system data, and for renaming said retrieved system data with said original name and restoring said retrieved system data on said first computer system using said original name.

39. The computer readable program code means of claim 33, further comprising:

computer readable program code means for causing a computer to effect at said second computer system in the multiple computer system environment, renaming of system data to be backed up with a second alternate name, said second alternate name of said renamed system data designating said second computer system as source system of said system data to be backed up and comprising a name different from any name of system data at said first computer system in the multiple computer system environment; and computer readable program code means for effecting backup storing of said renamed system data of said second computer system to memory of said first computer system in the multiple computer system environment using said second alternate name.

40. The computer readable program code means of claim 39, wherein said computer readable program code means for effecting back up storing of said renamed system data of said second computer system to memory of the first computer system comprises computer readable program code means for backup storing, at said second computer system, said renamed system data of said second computer system to memory of the first computer system.

41. The computer readable program code means of claim 39, further comprising computer readable program code means for initiating, at said second computer system, said computer readable program code means for effecting backup storing of said renamed system data of said second computer system to memory of the first computer system.

* * * * *